(12) United States Patent
Xue et al.

(10) Patent No.: US 9,161,255 B2
(45) Date of Patent: Oct. 13, 2015

(54) REPORTING METHOD, DETECTION METHOD, DEVICE AND SYSTEM FOR NETWORK STATE

(75) Inventors: Tao Xue, Shenzhen (CN); Junchao Du, Shenzhen (CN); Hui Liu, Shenzhen (CN); Qingzhe Deng, Shenzhen (CN); Chuanyi Liu, Shenzhen (CN); Xuan Li, Shenzhen (CN); Weizhen Ji, Shenzhen (CN); Xiaojun Li, Shenzhen (CN); Wen He, Shenzhen (CN); Wenjing Chen, Shenzhen (CN); Jiangkun Guo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 82 days.

(21) Appl. No.: 14/009,638

(22) PCT Filed: Mar. 20, 2012

(86) PCT No.: PCT/CN2012/072630
§ 371 (c)(1),
(2), (4) Date: Oct. 3, 2013

(87) PCT Pub. No.: WO2012/167644
PCT Pub. Date: Dec. 13, 2012

(65) Prior Publication Data
US 2014/0022997 A1 Jan. 23, 2014

(30) Foreign Application Priority Data

Jun. 7, 2011 (CN) .......................... 2011 1 0150961

(51) Int. Cl.
*H04W 80/04* (2009.01)
*H04W 88/06* (2009.01)
(Continued)

(52) U.S. Cl.
CPC .............. *H04W 24/10* (2013.01); *H04W 24/04* (2013.01)

(58) Field of Classification Search
CPC ...................................................... H04L 47/33
See application file for complete search history.

(56) References Cited

U.S. PATENT DOCUMENTS

| 8,693,339 | B2 * | 4/2014 | So .................................. 370/237 |
| 2007/0019593 | A1 | 1/2007 | Sarkar |
| 2011/0141891 | A1 | 6/2011 | So |

FOREIGN PATENT DOCUMENTS

| CN | 1835440 | 9/2006 |
| CN | 101489248 | 7/2009 |

(Continued)

OTHER PUBLICATIONS

International Search Report mailed Jun. 28, 2012 in International Application No. PCT/CN2012/072630.

(Continued)

*Primary Examiner* — Maharishi Khirodhar
(74) *Attorney, Agent, or Firm* — Plumsea Law Group, LLC

(57) ABSTRACT

A reporting method for a network state includes: an intermediate node receiving a data packet; the intermediate node marking the data packet according to the current network state; and the intermediate node forwarding the marked data packet. A detecting method for a network state includes: a sink node receiving a data packet; the sink node parsing the data packet to obtain the marking information about the network state; and the sink node determining the network state according to the marking information. A reporting device corresponding to the reporting method, a detecting device corresponding to the detecting method, and a detecting system comprising the reporting device and the detecting method are also provided.

15 Claims, 6 Drawing Sheets

(51) Int. Cl.
  *H04W 88/08* (2009.01)
  *H04W 24/10* (2009.01)
  *H04W 24/04* (2009.01)

(56) References Cited

FOREIGN PATENT DOCUMENTS

| CN | 101808289 | 8/2010 |
| CN | 102055677 | 5/2011 |
| CN | 102196481 | 9/2011 |
| EP | 2106068 A1 | 9/2009 |
| WO | 2005096566 A1 | 10/2005 |

OTHER PUBLICATIONS

European Search Report mailed Mar. 18, 2015 in European Patent Application 12 796 004.5.

\* cited by examiner

REPORTING METHOD, DETECTION METHOD, DEVICE AND SYSTEM FOR NETWORK STATE

CROSS-REFERENCE TO RELATED APPLICATION

This application is the U.S. National Phase application of PCT application number PCT/CN2012/072630 having a PCT filing date of Mar. 20, 2012, which claims the benefit of priority of Chinese Patent Application No. 201110150961.7 filed on Jun. 7, 2011, the disclosures of which are hereby incorporated by reference.

TECHNICAL FIELD

The present document relates to the field of communication, and more particularly, to a reporting method, a detecting method, device and system for a network state.

BACKGROUND OF THE RELATED ART

Wireless sensor network is a totally new information acquiring and processing technology, and has a wide application prospect in industry, military, environment, healthcare and other fields. However, as a distributed computing platform, node resources such as Central Processing Unit (referred to as CPU) speed, storage space, power and bandwidth are very limited, and the working environment of the wireless sensor network is unpredictable, a variety of external interference factors (such as temperature, vibration, electromagnetic field, etc.) are likely to cause failures such as RF conflicts, clock asynchrony, battery depletion, signal loss, software errors, and so on occurred in the network, which greatly reduce the reliability of sensor nodes, weaken or fail intended functions in the wireless sensor network. Various abnormal situations in the network will be diagnosed in a timely manner, searching for reasonable tolerance control solutions that guide the normal operation of the network, which has great significance in improving the reliability and robustness of the wireless sensor network.

Currently, the structure of wireless sensor network is more and more complicated, its function becomes perfect, and the degree of automation becomes higher and higher. How to prolong its life as far as possible is a relatively popular topic in recent years. The life of the wireless sensor network is mainly decided by the life of the node. However, the wireless sensor network often runs in an unattended, inaccessible by humans, harsh or even dangerous, remote environment, due to many unavoidable factors, the nodes have a variety of failures, which reduces or loses the intended functions of the wireless sensor network, and even causes serious damage and even paralysis of the entire network.

Biologists used the wireless sensor network in 2002 to finely observe the habits of petrels on a certain island. 30 sensor nodes were deployed on the island, and after the network ran for 20 days, more than half of the nodes failed completely, obviously, the failure rate of the nodes is very high. Failure rate of sensing components (modules) of the humidity sensor nodes and the nodes within the network is very high. In view of this, the design of the wireless sensor network must take failure diagnosis of the nodes, especially failure diagnosis of the node sensor components, into consideration.

The current wireless network diagnostics technology is mainly inserting additional control information data packets into the network, depending on these data packets, the network state is detected in real time, and this method uses the active inquiry mode, generally, particular nodes in the network send the control information data packets to each node, and after the nodes receive the control information packets, they feed back their own state to the particular node, after the particular node determines the current network state according to the received feedback, therefore, this active inquiry mode brings relatively great communication expenses to the network. Especially, in the case that the network state changes frequently, these additional communication overheads increase network traffic load.

So far, there is no effective solution for the problem of relatively heavy network burden caused by the method of determining the network state through the active inquiry mode in the related art.

SUMMARY OF THE INVENTION

The embodiment of the present document provides a reporting method, a detecting method, device and system for a network state, to at least solve the problem of relatively heavy network burden caused by a method of determining the network state through the active inquiry mode in the related art.

According to one aspect of the present document, a reporting method for a network state is provided, comprising: an intermediate node receiving a data packet; and the intermediate node marking the data packet according to a current network state; and the intermediate node forwarding the marked data packet.

Wherein, the data packet carries a source node identity and a data packet sequence number; the intermediate node marking the data packet according to a current network state comprises: the intermediate node judging whether the data packet is a first data packet sent by the source node or not according to the source node identity, if yes, checking whether the packet carries identity information of other nodes or not; if the packet does not carry identity information of other nodes, the intermediate node writing the intermediate node identity into a specified subfield in the data packet, and recording the source node identity and the data packet sequence number in a local data structure.

Wherein, the above-mentioned data packet further carries worst link quality and current link quality; before the intermediate node judges whether the data packet is the first data packet sent by the source node or not according to the source node identity, the method further comprises: after the intermediate node receives the data packet, it updating the current link quality in the data packet according to its own link quality, and checking whether the worst link quality in the data packet is greater than the updated current link quality or not; if yes, the intermediate node marking the value of a subfield where the worst link quality is located as the updated current link quality.

The above-mentioned data packet carries the number of hops passed by the data packet; the intermediate node marking the data packet according to the current network state comprises: when the intermediate node checks out that the data packet is not the first packet sent by the source node, it searching for a data structure entry corresponding to the source node identity in the local data structure; the intermediate node judging whether a data packet sequence number in the data packet and a data packet sequence number in the data structure entry are continuous or not, if yes, updating the packet sequence number in the data packet structure entry, and modifying the number of hops in the data packet; otherwise, marking the intermediate node identity in the data packet.

According to another aspect of the present document, a detecting method for a network state is provided, comprising: a sink node receiving a data packet; and the sink node parsing the data packet to obtain marking information of the network state; and the sink node determining the network state according to the marking information.

Wherein, the above-mentioned marking information comprises a source node identity, a data packet sequence number, an intermediate node identity, worst link quality, current link quality and the number of hops; the above-mentioned sink node determining the network state according to the marking information comprises: the above-mentioned sink node checking in a local path database whether there is a path entry corresponding to the source node or not; if there is not a path entry corresponding to the source node, the sink node determining the network state as a state that topology information of the source node is not established, and adding a source node entry into the local path database, the source node entry comprises: an intermediate node identity, the number of hops, a data packet sequence number and the worst link quality; if there is a path entry corresponding to the source node, the sink node generating a network state preliminary report according to the marking information, and updating the source node entry according to the marking information; the sink node making a statistic for the network state preliminary reports within a specified period, and determining the network state according to a statistic result.

Wherein, the sink node generating the network state preliminary report according to the marking information comprises: the sink node making a comparison to judge whether the sequence number in the data packet and a sequence number corresponding to the source node in the local path database are continuous or not, if not, generating an error report of packet loss, if yes, generating a transmission success report; the sink node determining whether the data packet is routing switched or not according to the source node entry, if yes, generating a routing switch report; the sink node generating the worst link quality report of the source node according to the source node entry.

Wherein, the sink node determining the network state according to the statistic result comprises: the sink node determining network information according to the statistic result, wherein, the network information comprises at least one of the following: a data packet transmission success rate, a packet loss rate of the source node, with or without routing switch, and the worst link quality corresponding to the source node, as well as a worst link quality similarity between the source node and an adjacent node; the sink node, according to the network information, using a back-propagation (BP) neural network to determine the network state, wherein, the network state is divided into following categories: normal, physically damaged, software conflict, network congestion and environmental impact.

Wherein, the process of determining the BP neural network comprises: the sink node setting a BP neural network of a hidden layer, and setting an activation function corresponding to the hidden layer, and an output layer function; the sink node inputting received training samples into the BP neural network, and setting E, a square sum of errors between the BP neural network output and the expected output:

$$E = \frac{1}{2} \sum_{k=1}^{l} \left\{ d_k - f\left[ \sum_{j=0}^{m} w_{jk} f\left( \sum_{i=0}^{n} v_{ij} x_i \right) \right] \right\}^2$$

Wherein, l represents that there are totally l nodes at the output of the BP neural network, $d_k$ is the expected output vector, f is the activation function of the hidden layer, m represents the number of nodes in the hidden layer, n indicates the number of nodes in the input layer, $w_{jk}$ represents weight between the $j^{th}$ node in the hidden layer and the $k^{th}$ node in the output layer, $net_j$ represents the output of the $j^{th}$ node in the input layer, $v_{ij}$ is the weight between the $i^{th}$ node in the input layer and the $j^{th}$ node in the hidden layer, and $x_i$ represents the input value of the $i^{th}$ node in the input vector of the input layer;

the sink node narrows E down to the preset target range by adjusting $w_{jk}$ and $v_{ij}$; wherein, $$\Delta w_{jk} = \eta(d_k - o_k)o_k(1 - o_k)y_j;$$

$$\Delta v_{ij} = \eta \left( \sum_{k=1}^{l} \delta_k^o w_{jk} \right) y_j(1 - y_j)x_i;$$

wherein, $\eta$ is a gradient descent constant, indicating a scale factor, and $\eta \in (0,1)$; $y_j$ is the output value of the $j^{th}$ node in the output vector of the output layer, $o_k$ is the output vector of the output layer, $d_k$ is the expected output vector, and $\delta_k^o$ is the back propagation error of the output node k.

According to another aspect of the present document, a reporting device for a network state is provided, comprising: a receiving module, configured to receive a data packet; a marking module, configured to mark the data packet according to a current network state; a forwarding module, configured to forward the marked data packet.

Wherein, the marking module comprises: a judging unit, configured to judge whether the data packet is the first data packet sent by the source node or not according to a source node identity in the data packet; a checking unit, configured to, when a judging result of the judging unit is YES, check whether the data packet carries marking information of other nodes or not; a marking unit, configured to, when a checking result of the checking unit is NO, write the intermediate node identity into a specified subfield of the data packet, and record the source node identity and a sequence number of the data packet in a local data structure.

Wherein, the marking module further comprises: a link quality detecting unit, configured to, after receiving the data packet, update the current link quality in the data packet according to its own link quality, and detect whether the worst link quality of the data packet is greater than the updated current link quality or not; a link quality marking unit, configured to, when a detecting result of the link quality detecting unit is YES, mark the value of a subfield where the worst link quality is located as the updated current link quality.

Wherein, the marking module further comprises: a searching unit, configured to, when the judging result of the judging unit is NO, search the local data structure for a data structure entry corresponding to the source node identity; a sequence number judging unit, configured to judge whether a data packet sequence number in the data packet and a data packet sequence number in the data structure entry searched out by the searching unit are continuous or not; a hop number modifying unit, configured to, when the judging result of the sequence number judging unit is YES, update the data packet sequence number in the data structure entry, and modify the number of hops in the data packet; a node marking unit, configured to, when the judging result of the sequence number judging unit is NO, mark the intermediate node identity in the data packet.

According to a further aspect of the present document, a detecting device for a network state is provided, comprising: a data packet receiving module, configured to receive a data packet; a marking information acquiring module, configured to parse the data packet to obtain the marking information of the network state; a network state determining module, configured to determine the network state according to the marking information.

Wherein, the marking information acquisition module comprises: a parsing unit, configured to parse the data packet; a marking information acquiring unit, configured to acquire the mark information parsed out by the parsing unit, wherein the marking information comprises a source node identity, a data packet sequence number, an intermediate node identity, the worst link quality, current link quality and the number of hops; the network state determining module comprises: a checking unit, configured to check whether there is a path entry corresponding to the source node in the data packet in the local path database or not; a first state determining unit, configured to, when a checking result of the checking unit is YES, determine the network state as a state that topology information of the source node is not established; a database modifying unit, configured to, when the first state determining unit determines the network state as a state that the topology information of the source node is not established, add a source node entry into the local path database, wherein the source node entry comprises: an intermediate node identity, the number of hops, a data packet sequence number and the worst link quality; a second state determining unit, configured to, when the checking result of the check unit is NO, generate a network state preliminary report depending on the marking information, and update the source node entry according to the marking information; and make a statistic for network state preliminary reports within a specified period, and determine the network state according to the statistic result.

The second state determining unit comprises: a comparing sub-unit, configured to make a comparison to judge whether the sequence number in the data packet and the sequence number corresponding to the source node in the local path database are continuous or not; an error report generating sub-unit, configured to, when the comparing result of the comparing sub-unit is discontinuity, generate an error report of packet loss; a transmission success report generating sub-unit, configured to, when the comparing result of the comparing sub-unit is continuity, generate a transmission success report; a routing switch report generating sub-unit, configured to judge whether the data packet is routing switched or not according to the source node entry, and if yes, generate a routing switch report; a link quality report generating sub-unit, configured to generate the worst link quality report of the source node according to the source node entry.

Wherein, the second state determining unit comprises: a network information determining sub-unit, configured to determine the network information according to the statistic result, wherein, the network information comprises at least one of the following: a data packet transmission success rate, a packet loss rate of the source node, with or without routing switch, a worst link quality corresponding to the source node, and a worst link quality similarity between the source node and an adjacent node; a network state determining sub-unit, configured to, according to the network information determined by the network information judging sub-unit, use a BP neural network to determine the network state, wherein, the network state is divided into the following categories: normal, physically damaged, software conflict, network congestion and environmental impact.

According to a further aspect of the present document, a detecting system for a network state is provided, comprising: intermediate nodes and sink nodes, wherein the intermediate node comprises the reporting device for a network state, and the sink node comprises the detecting device for a network state.

With the present document, the intermediate node is used to mark the received data packet, so that the sink node can judge the current network state according to the marking information, this method of directly marking the data packet does not need the sink node to initiate an inquiry, and the sink node directly uses the marking information in the data packet to obtain the network state, which reduces message signaling in the network state detecting process and solves the problem of relatively heavy network burden due to the method of using active inquiry to determine the network state, thereby prolonging the life of each node and optimizing the system performance.

BRIEF DESCRIPTION OF DRAWINGS

The accompanying drawings described herein are used to provide a further understanding of the present document and constitute a part of the present document, and the exemplary embodiments and the description of the present document are used to explain the present document and do not constitute a restriction of the present document. In the accompanying drawings.

PREFERRED EMBODIMENTS OF THE INVENTION

Hereinafter, with reference to the accompanying drawings and the embodiments, the present document will be described in detail. It should be noted that, in case of no conflict, the embodiments of the present application and features of the embodiments could be combined with each other.

The embodiments of the present document provide a reporting method, a detecting method, device and system for a network state, which are particularly suitable for wireless sensor network and can also be used for other networks, to reduce excessive energy consumption due to the network state detection.

The First Embodiment

Figure 1:
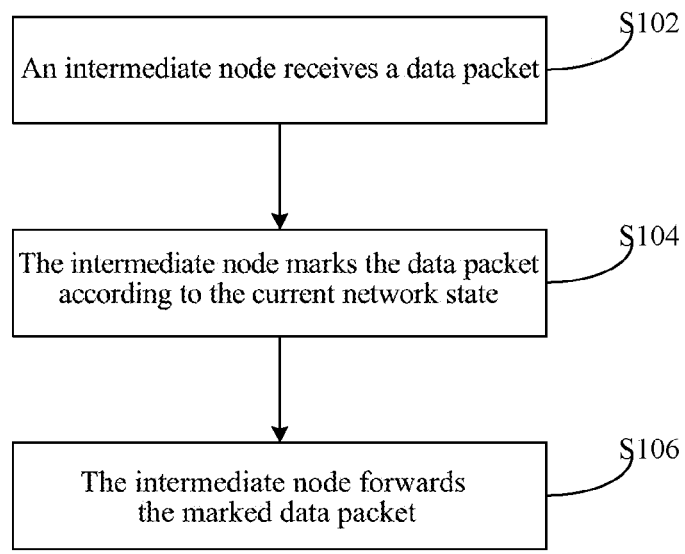
FIG. 1 is a flow chart of a reporting method for a network state in accordance with a first embodiment of the present document.

The present embodiment provides a reporting method for a network state, and the method is described from the intermediate node side to illustrate the processing procedure after the intermediate node receives the data packet, and refer to FIG. 1, the method comprises the following steps (Step S102-Step S106):

In step S102, the intermediate node receives the data packet.

the data packet may come from a source node or another intermediate node; if it comes from the source node, the data packet carries the source node identity and the data packet sequence number to indicate which node sends the data packet firstly, and the sequence number of the data packet, so that the subsequent node performs the network state information marking operation; if it comes from another intermediate node, in addition to the source node identity and the data packet sequence number, it also may comprise: link quality and/or the number of hops, for example, the worst link quality and the current link quality, wherein, the worst link quality is used to mark the worst link quality in the path traversed by the packet, the current link quality is used to mark the current link quality in the path passed by the data packet; the number of hops is used to mark the number of hops that the data packet passes through and is used to establish the network topology.

In Step S104, the intermediate node marks the data packet according to the current network state.

After the intermediate node receives the data packet, it can perform the following operations: the intermediate node judges whether the data packet is the first data packet sent by the source node or not according to the source node identity, if yes, checks whether the data packet carries the marking information of other nodes or not; if it checks out that the data packet does not carry the marking information of other nodes, the intermediate node writes the intermediate node identity into a subfield specified by the data packet, and records the source node identity and the data packet sequence number in the local data structure.

At the beginning, the data packet only has the source node identity, and the data packet is marked in the data packet transmission process, in this embodiment, the data packet is identified by an intermediate node. Therefore, if the data packet carries the marking information of other nodes, the intermediate node will directly forward the data packet out.

Preferably, when the data packet also carries the worst link quality and the current link quality, before the intermediate node judges whether the data packet is the first one sent by the source node or not according to the source node identity, the step may further comprise: after the intermediate node receives the data packet, it updates the current link quality in the data packet according to its own link quality, and checks whether the worst link quality in the data packet is greater than the updated current link quality or not; if yes, the intermediate node marks the value of the subfield where the worst link quality is located as the updated current link quality. This ensures that the worst link quality carried in the data packet is authentic and reliable, and provides reliable data for the sink node to perform the network state detection.

If the above-mentioned data packet carries the number of hops passed by the data packet, the intermediate node marking the data packet according to the current network state further comprises: when the intermediate node checks that the data packet is not the first packet sent by the source node, it searches for the data structure entry corresponding to the source node identification in the local data structure; the intermediate node judges whether the data packet sequence number in the data packet and the data packet sequence number in the data structure entry are continuous or not, if continuous (which means no packet loss), it updates the data packet sequence number in the data structure entry, and modifying the number of hops in the data packet (such as the original number of hops plus one); if not continuous (which means there is packet loss), it marks the intermediate node identity in the data packet.

In Step S106, the intermediate node forwards the marked data packet.

With the above-mentioned method, the intermediate node marks the received data packet, in turn, enables the sink node to judge the current network state according to the marking information, and this method of directly marking the data packets does not need the sink node to initiate an inquiry, and the sink node directly uses the marking information in the data packet to obtain the network state, which reduces the message signaling in the network state detecting process and solves the problem of relatively heavy network burden due to the method of using the active inquiry to determine the network state, hence prolonging the life of each node and optimizing the system performance.

Figure 2:
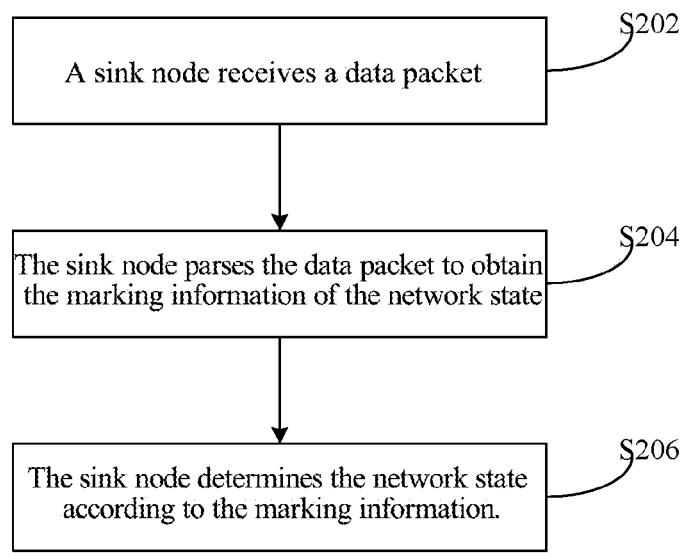
FIG. 2 is a flow chart of a detecting method for a network state according to the first embodiment of the present document.

The present embodiment also provides a detecting method for a network state, and the method is described from the sink node side, and as shown to FIG. 2, the method comprises the following steps (Step S202-Step S206):

In step S202, the sink node receives a data packet;

In step S204, the sink node parses the data packet to obtain the marking information of the network state; from the above-mentioned method, it can be seen that the data packet received by the sink node comprises the following marking information: a source node identity, a data packet sequence number, an intermediate node identity, the worst link quality, the current link quality and the number of hops. The meaning of each piece of information is the same as its peer in the above-mentioned method and will not be repeated here.

In Step S206, the sink node determines the network state according to the marking information.

For example, the sink node checks whether there is a path entry corresponding to the source node in the local path database or not; if not, the sink node determines the network state as a state that the topology information of the source node state is not established, and adds a source node entry into the local path database, the source node entry comprises: an intermediate node identity, the number of hops, a data packet sequence number and the worst link quality; if yes, the sink node generates a network state preliminary report according to the marking information, and updates the source node entry according to the marking information; the sink node makes a statistic for network state preliminary reports within a specified period, and determines the network state according to the statistic result.

Wherein, the sink node generating a network state preliminary report according to the marking information comprises:

1) the sink node makes a comparison to judge whether the sequence number in the data packet and the sequence number corresponding to the source node in the local path database are continuous or not, if not, generates an error report of packet loss, if yes, generates a transmission success report;

2) the sink node judges whether the packet is routing switched or not according to the source node entry, and if yes, generates a routing switch report;

3) the sink node generates the worst link quality report of the source node according to the source node entry.

According to the above-mentioned report, the sink node determining the network state according to the statistic result comprises: the sink node determines the network information according to the statistic result, wherein, the network information comprises at least one of the following: a data packet transmission success rate, a packet loss rate of the source node, with or without routing switch, the worst link quality corresponding to the source node and a worst link quality similarity between the source node and an adjacent node; the sink node, according to the network information, uses the BP neural network to determine the network state, wherein, the network state is divided into the following categories: normal, physically damaged, software conflict, network congestion and environmental impact.

Wherein, the BP neural network can be pre-adjusted and optimized according to experimental data to ensure that the obtained output result is authentic and reliable, and the specific optimization and parameter adjustment mode can refer to the relevant technology.

With the above-mentioned method, when a network failure occurs, the failure can be found timely and located accurately to obtain the most likely network failure type and provide a basis for the next network troubleshooting. In particular, when the above-mentioned method is applied to the sensor network, through the failure diagnosis, various abnormal states or failure conditions can be timely and accurately diagnosed, thus to prevent or eliminate the failures, and to provide necessary guidance for the operation of the sensor and improve reliability, safety and efficacy of the node operation, thus reducing the failure loss to the minimum; the maximal design capabilities of the wireless sensor network is guaranteed, so that under any allowable condition, the potential of the wireless sensor network can be fully tapped and its life can be prolonged.

The Second Embodiment

Figure 3:
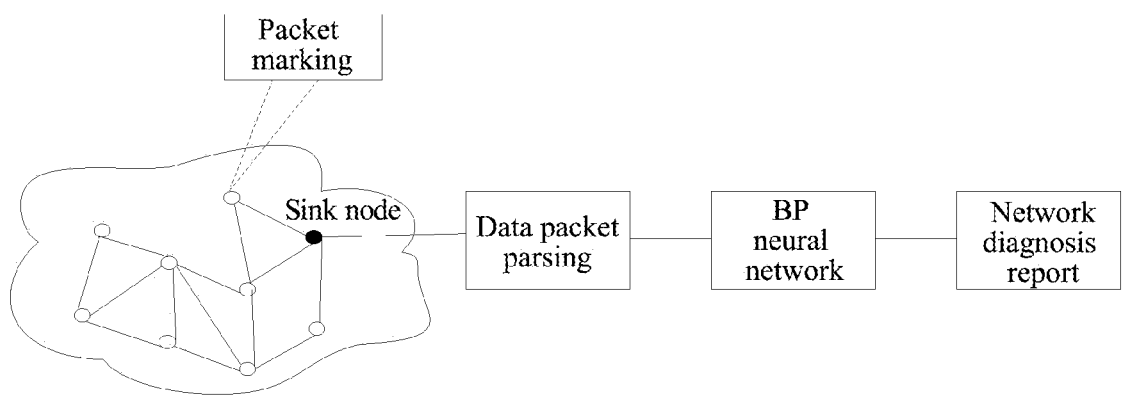
FIG. 3 is an architecture diagram of failure detecting of a wireless sensor network according to a second embodiment of the present document.

The present embodiment of the present document will be described for the wireless sensor network, and in the process of diagnosing failures in the sensor network in this embodiment, adopting a mode of combining the passively receiving of the sink node with the BP neural network, as the schematic diagram of troubleshooting shown in FIG. 3, a packet marking function module is added into each node in the network, so that the data packet can be marked timely when any network state abnormity occurs, and the routing information of each source node in the wireless sensor network is passively collected, and the information is aggregated and integrated in the sink nodes as a basis for diagnosis. Then, the information at the sink node is analyzed and integrated as input parameters of the BP neural network. The BP neural network is structured, and the network failure state is diagnosed according to the output feature vector of the BP neural network. The specific steps are as follows:

In step 1, a data packet marking function module is added into each node in the wireless sensor network, whenever the node receives a data packet from another node, it judges whether the data packet should be marked or not according to the packet marking algorithm. For example, if the value of the transmission sequence subfield in the data packet received by the node and that stored in the local node are not continuous, it can be concluded that there is packet loss occurring in the data packet transmitting process. At this time, the node can mark the data packet, and the marking way is to write the local node's identity (referred to as ID) into the marking node identity unit of the data packet.

In Step 2, a parse function module of data packet marking is added into the sink node in the wireless sensor network. If the data packet is marked by a certain node, it is considered that there is packet loss and network routing switch happening at the node. According to the node ID in the marking subfield in the data packet, the specific location at which the node has an exception can easily be recorded.

In Step 3, the parse function module of data packet marking of the sink node in the wireless sensor network first makes macro and incomplete judgment for the network state, including the transmission success report, the data packet loss report and the network routing switch report, to obtain the network topology. The sink node in the wireless sensor network maintains a set of data structures (corresponding to the path database in the first embodiment), and the data structure contains the routing structure of the entire network, that is, the network topology.

In Step 4, the information of each source node in the wireless sensor network is collected. The acquisition way is that the source node actively sends the data packet to the sink node, and sets a fixed data packet transmission frequency for the source node, and the source nodes within the network space send messages sequentially to the sink nodes. The sink nodes maintain a data structure, and the table contains the current routing of each source node that sends message to it. Each entry in the table comprises the Hop [count] of the path from the specific source node to the sink node; the worst link quality factor in the path; the sequence number of the packet that expects to be received next, the number of Success Reports [cursor] received within a period of time.

In Step 5, from the table entries at the sink node, it is to extract and parse the network state information as the next input parameter of the BP neural network. The network state information comprises: (1) the number of data packet transmission success reports received in N cycles, and N is a constant set according to the specific network condition; (2) the packet loss rate of the source node; (3) with or without routing switch; (4) the worst link quality of the routing path of the source node.

In Step 6, the above-mentioned network state information parameter is taken as an input vector of the BP artificial neural network.

In Step 7, the BP neural network is used to diagnose the wireless sensor network, extract the failure eigenvector, and determine the network fault type. The adaptive learning rate algorithm is used to accelerate the BP network training speed, and set an appropriate square sum of error, BP network structure, learning speed enhancement and reduction factors, and activation function and output function of hidden layer in the network. With a large number of training samples, it is to determine the above-mentioned parameters and the BP network structure. Finally, it is to determine the network failure type through the output eigenvector.

The main operation of the above-mentioned marking algorithm is to allow the sensor nodes to add their own ID information into the transmitted data packet. Due to the restrictions on the size of the data packet transmitted in the sensor network, this marking information only uses 4 extra bytes. The sink nodes in the network analyze the marked data packet to establish a path from the source node to the sink node. By establishing the path information of different source nodes, the network topology is established along the direction of data transmission. If the network state remains stable, this marking operation will automatically stop after the network topology is established. When the network state changes, for example, when there is packet loss or a routing switch occurs, this marking operation automatically starts to work again in the location at which the error occurs.

As shown in Table 1, in this embodiment, each data packet contains the following sub fields:

TABLE 1

| .... | Source node ID | Data packet sequence number | Routing hop count | Marking node ID | Worst link quality | Current link quality |
|---|---|---|---|---|---|---| wherein, the source node ID subfield is used to indicate the source node of the data, that is, the identity of the source node that sends the data.

The data packet sequence number subfield is used to identify the data packet and is taken as a judgment basis for whether the data packet is continuous or not.

The routing hop count subfield is used to mark the number of hops that the data packet passes and is used to establish the network topology.

The marking node ID is used to indicate the ID of the node that marks the data packet, and is an important basis for accurate fault location.

The worst link quality is used to mark the worst link quality in the path that the data packet passes through.

The current link quality is used to mark the current link quality in the path that the message packet passes through.

In this embodiment, each intermediate node maintains a data structure to store the information related to the source node that communicates with it, and each data structure comprises: a source node ID subfield, a sequence number subfield of the latest received data packet. This data structure saves the IDs of all the source nodes that establish communication with the node.

Figure 4:
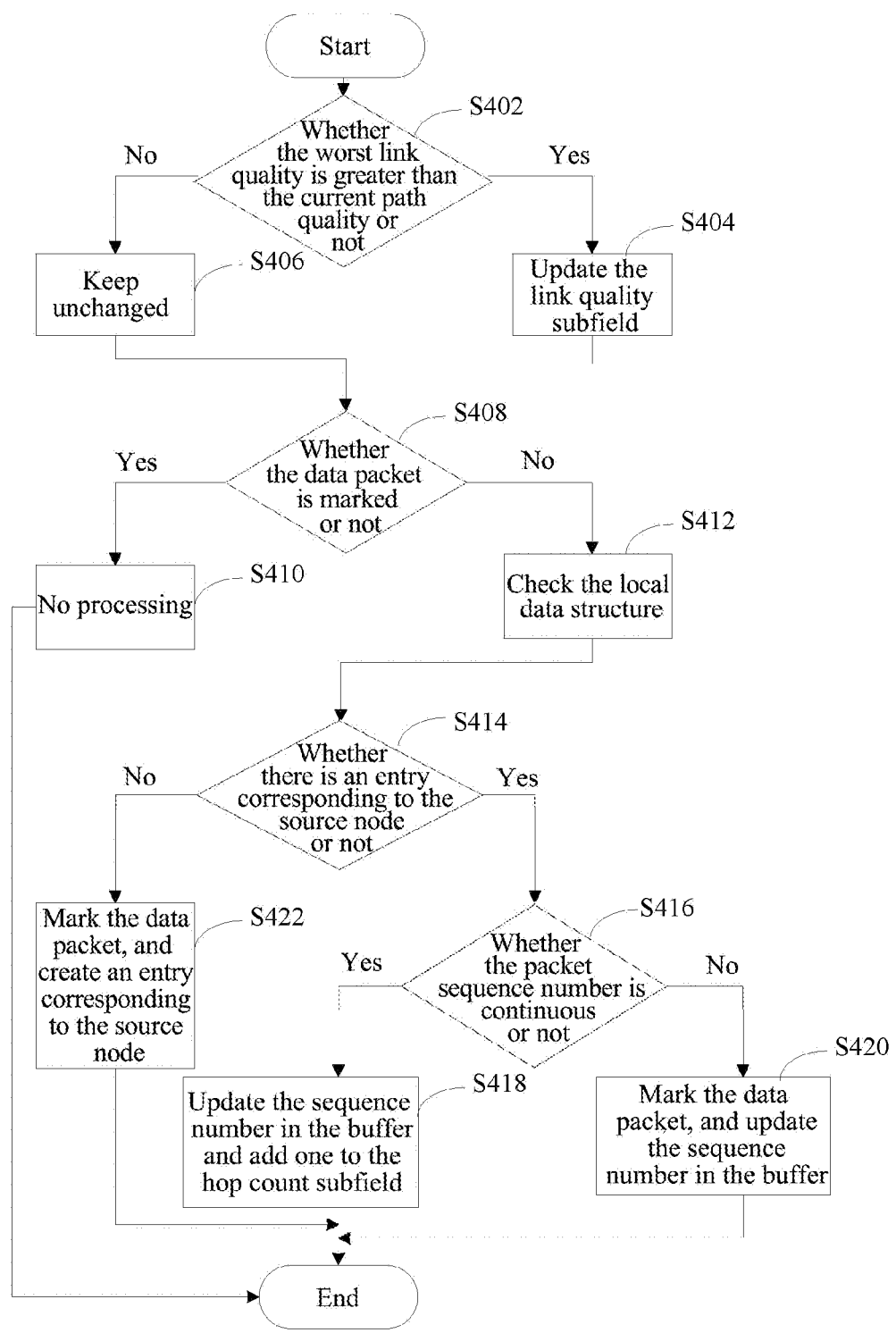
FIG. 4 is a flow chart of a data packet marking algorithm performed by an intermediate node according to a second embodiment of the present document.

As shown in FIG. 4, the packet marking algorithm performed by the intermediate node in this embodiment comprises the following steps:

In step S402, when receiving a data packet, the intermediate node first checks whether the worst link quality in the data packet is greater than the current path quality or not, if yes, it is to proceed to step S404; otherwise, it is to proceed to step S406;

In step S404, the intermediate node updates the value of the worst link quality subfield in the data packet as the value of the current link quality;

In step S406, the value of the worst link quality subfield in the data packet is kept unchanged;

In step S408, the intermediate node checks whether the node is marked by other nodes or not, if yes, it is to proceed to step S410; otherwise, it is to proceed to step S412;

In step S410, no operation is performed on the data packet, and the process ends;

In step S412, it is to check the local data structure;

In step S414, it is to judge whether there is an entry corresponding to the source node in the local data structure or not, if yes, it is to proceed to step S416; otherwise, it is to proceed to step S422;

In step S416, it is to judge whether the data packet sequence number is continuous or not according to the sequence number subfield corresponding to the source node, if yes, it indicates that the data transmission is normal, it is to proceed to step S418; otherwise, it indicates that there is packet loss occurring during the data transmission, and it is to proceed to step S420;

In step S418, it is to update the sequence number subfield and add one to the hop count subfield of the data packet, and forward the data packet out, and then the process ends;

In step S420, it is to mark the data packet, update information in the data structure field and forward the data packet out, and then the process ends;

In step S422, it is to mark the data packet, create a data structure entry corresponding to the source node, and then the process ends.

With such operation, data packets that have problems can be timely detected and marked, while there is no operation on the data packets in normal communication. This greatly reduces the communication costs and computational expense of the entire system.

The sink nodes also participate in this marking process, and create a table entry according to the source node and the data sequence number information. According to the above-mentioned marking algorithm, the marked data packet received by the sink node carries a node ID on the routing path and the number of hops between the node and the sink node. With this information, it can determine a path from the source node to the sink node. It is a process from the beginning of establishing the path to the completion of the establishment, and it requires obtaining adequate path information. It takes at least a few data transmitting and receiving cycles, and the exact number of the cycles has to be determined according to specific network circumstances.

Figure 5:
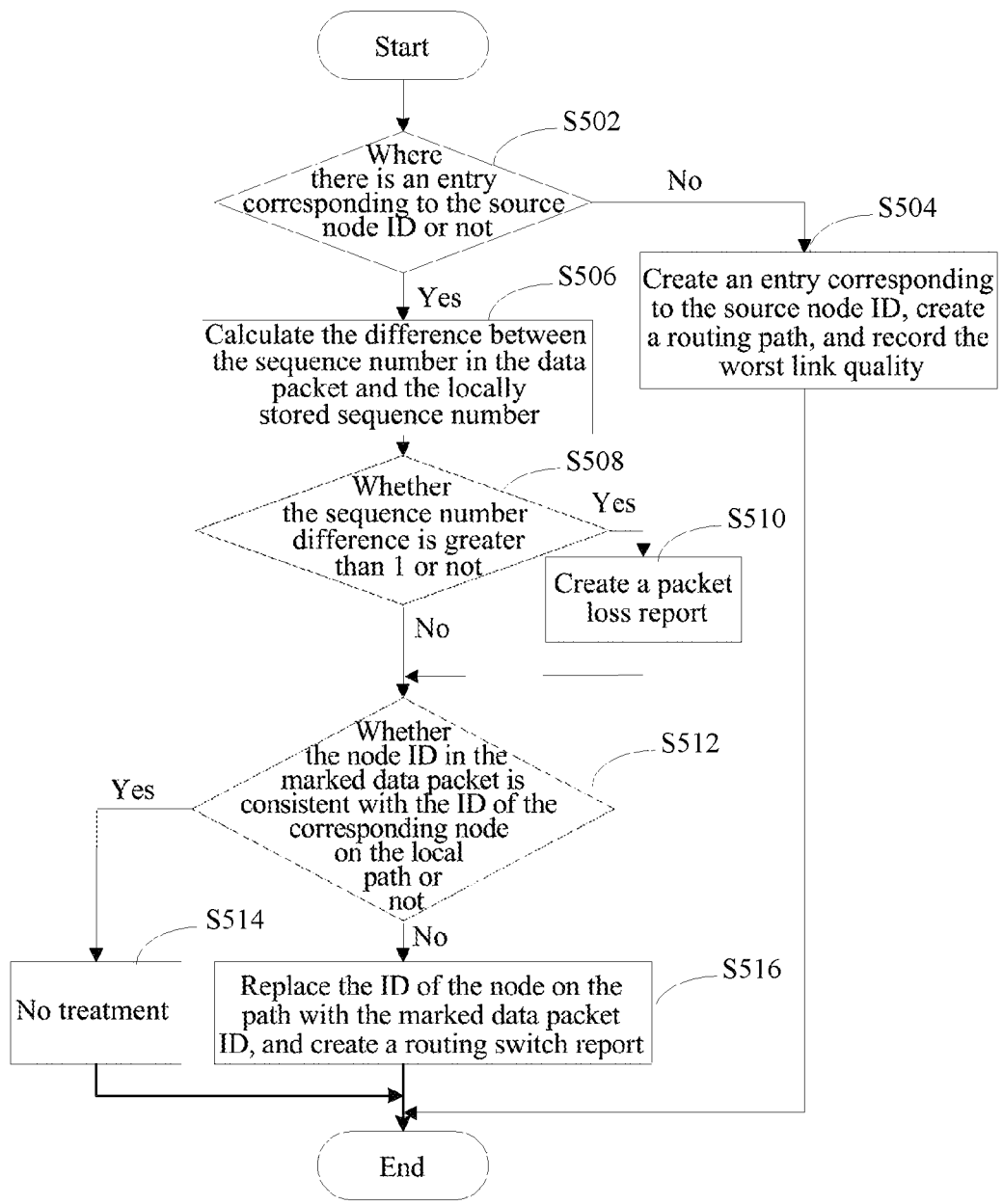
FIG. 5 is a flow chart of an algorithm for parsing the marked data packet performed by a sink node according to the second embodiment of the present document.

According to the information provided by the received data packet, the sink node makes a preliminary judgment on the network state information and obtains a preliminary report. At the sink node, a marking and parsing module parses the marking information of the received data packet. The sink node maintains a path related data structure, and the data structure is divided into many small segments. Each segment stores a node ID in the path and the number of hops corresponding to it, denoted as Hop [count]. As shown in FIG. 5, the data packet parsing algorithm comprises:

In step S502, when the sink node receives a new data packet, the parsing module first checks whether there is a path entry corresponding to the source node or not, and if not, it indicates that it is the first time of receiving a data packet from the source node, it is to proceed to step S504; if yes, it is to proceed to step S506.

In step S504, it is to create a path entry corresponding to the source node, and store the ID information of the source node in the first segment of the path structure entry, while record the worst link quality in the path. And then it is to check whether the data packet is marked or not, if yes, it is to store the marking node ID into the field corresponding to the number of hops in the path structure according to the content of the hop count subfield presented in the data packet, and the process ends.

In Step S506, it is to calculate the difference between the sequence number in the data packet and the locally stored sequence number.

In Step S508, it is to judge whether the sequence number difference is greater than 1 or not, if yes, it is to proceed to step S510; otherwise, it is to proceed to step S512.

In Step S510, it is to create an error report of packet loss.

The latest received data sequence number is also maintained in the path structure corresponding to the source node, after receiving a new data packet, the sink node compares the original sequence number with the sequence number in the data packet, if the difference therebetween is greater than 1, it indicates that there is packet loss occurring in the path, and at this time, an error report of packet loss is generated.

In Step S512, it is to judge whether the node ID in the data packet is consistent with the node identity in the local data structure or not, if they are consistent, it is to proceed to step S514; otherwise, it is to proceed to step S516.

In step S514, no treatment is performed, and the process ends.

In Step S516, a routing switch report is created, and the process ends.

If the node ID in the hop [Count] corresponding to the value of the hop count subfield in the data packet is not consistent with the node ID marked in the data packet, it indicates that there is route switching occurring in the path. A routing switch report is generated at this time, meanwhile, it is to update the value in the corresponding hop [Count], at the same time, it is to indicate that the path information after the segment of hop [Count] begins is no longer reliable and is deleted, and the packet marking operation is started to reconstruct the path.

The data packet marking and parsing module establishes and updates the network topology through this recorded path information. For each connection in the network, the number of data packets sent over the connection indicates the utilization of this connection. This kind of data represents the intensity of the connection between the parent nodes and their child nodes in the network.

The data packet parsing module makes a rough and incomplete report, including a transmission success report, a packet loss report, a network routing switch report, and the value of the worst link quality corresponding to the source node.

The report obtained at the sink node is analyzed to obtain the network information, including: (1) the number of data packet transmission success reports received in N cycles, wherein N is a constant set according to the specific network condition; (2) the packet loss rate of the source node; (3) with or without routing switch; (4) the parameter of the worst link quality of the routing path of the source node.

P1—a success rate of the transmitted message packets received in N cycles, wherein N is a constant set according to the specific network condition. A SuccessReport [N] is stored in the form of a table entry, and the value of it is initialized to 0. The variable of Cursor is used to identify the current position, if a message transmission success report corresponding to the source node is received before the next cycle, the value of the current position is set to 1, otherwise, it is set to 0. The cursor returns back to the first position in the SuccessReport queue after the SuccessReport leaves the $N^{th}$ position, which is equivalent to a circular list. The sum of all the values in SuccessReport equals to the number of message packet transmission success reports obtained in the N cycles, and the ratio of this number to N is the data packet transmission success rate.

P2—the data packet loss rate of the source node. After the sink node receives the marked data packet, if the difference between the values in the data packet sequence subfield is greater than 1, it can be identified that a packet loss occurs at the marking node. The number of data packets lost in the network is recorded in N cycles. The ratio of this number to N is the packet loss rate of the corresponding source node.

P3—with or without routing switch. It is to learn whether there is a routing switch in the network or not according to reports at the sink node in the previous step. If there is routing switch, it is denoted as P3=1, otherwise it is denoted as P3=0.

P4—a parameter of the worst link quality of the routing path of the source node, namely, the worst link quality on the source node routing path in the routing entry at the sink node. The link quality value range is [0,255], and the link quality is preferred to be 255.

P5—a worst link quality similarity with an adjacent node. The source node compares its link quality with that of other source nodes within the same physical area, and the value range of the similarity is (0,1) from small to large.

Figure 6:
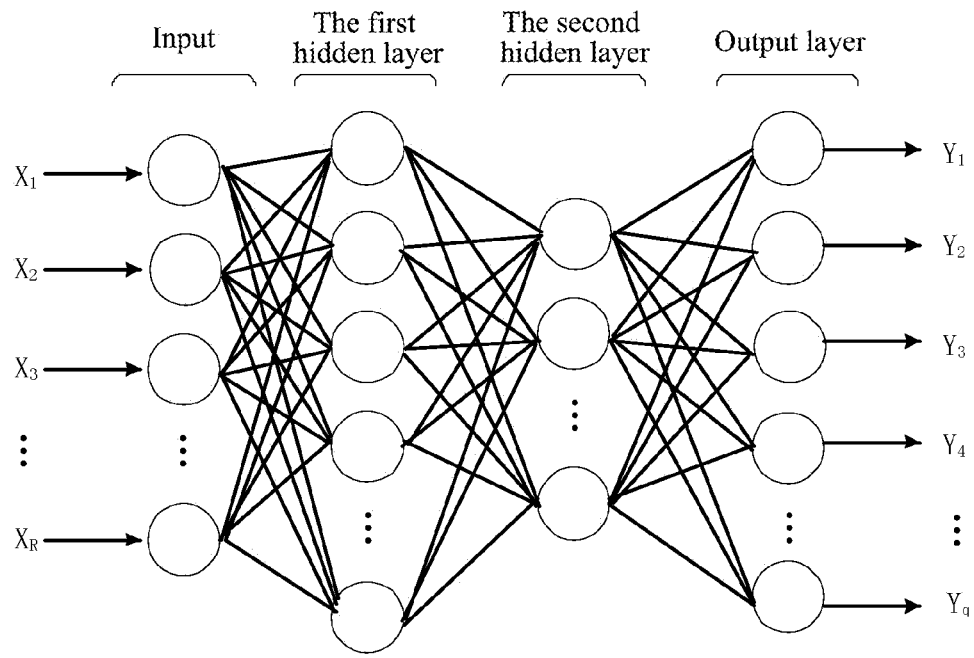
FIG. 6 is a schematic diagram of a basic structure of the BP artificial neural network in accordance with the second embodiment of the present document.

The present embodiment uses the BP neural network to diagnose the wireless sensor networks, extract the failure eigenvector, and determine the network failure type. The learning of the BP network uses the error back propagation algorithm, namely the BP algorithm. As shown in FIG. 6, its main idea is to divide the learning process into two stages: in the first stage (forward propagation of signal), an input sample (as $X_1, X_2, X_3 \ldots X_R$ shown in FIG. 6) is given to pass through the input layer, and the hidden layer processes layer by layer and calculates the actual output value of each unit; in the second stage (back propagation of error), if the expected output value is not obtained in the output layer, the difference between the actual output and the expected output is calculated layer by layer iteratively, and this difference is back propagated layer by layer in some form through the hidden layer to the input layer, and this error is divided to all units in each layer, so that each layer unit obtains an error signal (such as $Y_1, Y_2, Y_3, Y_4 \ldots X_q$ shown in FIG. 6), and this error signal is the basis for correcting the weight of each unit. This process of adjusting each layer weight of signal forward propagation and error back propagation is circular, and the weight adjustment process is also the network learning process. This process continues until the network output error is reduced to a predetermined value.

The input layer of the BP network is the five parameters obtained in the third step. The output layer of the BP network uses four neurons to represent five types of network state: (1) normal; (2) physically damaged; (3) software conflict; (4) network congestion; (5) environmental impact, which are represented with F1 to F4 respectively.

This embodiment uses an improved method of the BP algorithm: the adaptive learning rate method. The square sum of Error is set to 0.5. The training samples are input to the BP neural network, trial and adjustment are performed, and the number of layers in the BP neural network structure and the number of nodes in each layer, a learning speed, a learning enhancement factor, and a learning reduction factor are determined. According to the experimental data and experience, it is to select a BP neural network for two hidden layers, and to set the activation function corresponding to each hidden layer, for example, choose the activation function of the first hidden layer as tan sig, and choose the activation function of the hidden layer 2 as log sig, choose the output layer function as purelin; these three are functions in Matlab language, and of course, depending on the difference between the programming languages used, other functions can be used.

When the network output is inconsistent with the expected output, the output square sum of error, E, is defined as follows:

$$E = \frac{1}{2}(d-o)^2 = \frac{1}{2}\sum_{k=1}^{l}(d_k - o_k)^2$$

Wherein $o_k$ is the output vector of the output layer, $d_k$ is the desired output vector. l indicates that there are totally l nodes at the output of the network.

It is expanded to the hidden layer:

$$E = \frac{1}{2}\sum_{k=1}^{l}[d_k - f(net_k)]^2 = \frac{1}{2}\sum_{k=1}^{l}\left[d_k - f\left(\sum_{j=0}^{m}w_{jk}y_j\right)\right]^2$$

l indicates that there are totally l nodes at the output of the network, $d_k$ is the expected output vector, $net_k$ is the output of the $k^{th}$ node in the hidden layer, f is the activation function of the hidden layer, m represents the number of nodes in the hidden layer, $w_{jk}$ represents the weight between the $j^{th}$ nodes in the hidden layer and the $k^{th}$ node in the output layer, $y_j$ means the output of the $j^{th}$ node in the hidden layer. Herein, the two hidden layers are unified as "hidden layer", this formula mainly reveals the three-iteration structure "input layer-hidden layer-output layer" of the BP neural network, and does not emphasize the specific stratification and the specific implementation of each layer. It is further expanded to the input layer, there is:

$$E = \frac{1}{2}\sum_{k=1}^{l}\left\{d_k - f\left[\sum_{j=0}^{m}w_{jk}f(net_j)\right]\right\}^2 =$$

$$\frac{1}{2}\sum_{k=1}^{l}\left\{d_k - f\left[\sum_{j=0}^{m}w_{jk}f\left(\sum_{i=0}^{n}v_{ij}x_i\right)\right]\right\}^2$$

l indicates that there are totally l nodes at the output of the network, $d_k$ is the desired output vector, f is the activation function of the hidden layer, m represents the number of nodes in the hidden layer, $w_{jk}$ represents the weight between the $j^{th}$ node in the hidden layer and the $k^{th}$ node in the output layer, $net_j$ is the output of the $j^{th}$ node in the hidden layer, $v_{ij}$ means the weight between the $i^{th}$ node of the output layer and the $j^{th}$ node in the hidden layer, and $x_i$ represents the input of the $i^{th}$ node of the input layer.

It can be seen that, the network error is a function of the weights $w_{jk}$ of the layers, so that the weights are adjusted to change and narrow the error E into the defined target range.

$$\Delta w_{jk} = -\eta \frac{\partial E}{\partial w_{jk}} \quad j = 0, 1, 2, \ldots, m; k = 1, 2, \ldots, l$$

$$\Delta v_{ij} = -\eta \frac{\partial E}{\partial v_{ij}} \quad i = 0, 1, 2, \ldots, n; k = 1, 2, \ldots, m$$

wherein, the gradient descent constant $\eta\epsilon(0,1)$ represents the scale factor and reflects the learning rate in the training. After derivation, the weight value adjustment formula of the BP learning algorithm can be obtained as:

$$\Delta w_{jk} = \eta(d_k - o_k)o_k(1 - o_k)y_j$$

$$\Delta v_{ij} = \eta\left(\sum_{k=1}^{l}\delta_k^o w_{jk}\right)y_j(1 - y_j)x_i$$

wherein, the above-mentioned $x_i$ is the input vector, $y_j$ the output vector, $o_k$ the output vector of the output layer, $d_k$ the expected output vector, and $\delta_k^o$ the back propagation error of the output node k. Training through a large number of training samples, the square sum of error can meet the required accuracy, and the training ends. Depending on the characteristics of the selected samples, when the unit of each input or output component is different, corresponding to different components, transformation is performed respectively within their value ranges. The parameter of the worst link quality P4 is normalized. Meanwhile, according to the characteristics of the wireless sensor, the threshold is selected as 0.80, if the factor in the output vector is greater than the threshold value, it indicates that the output is a failure output, and otherwise, it is a normal output. With the above-mentioned method, the following table lists some sample training results of the BP network, as shown in Table 2.

TABLE 2

| Failure mode | Input vector | | | | | Output vector | | | | Failure type |
|---|---|---|---|---|---|---|---|---|---|---|
| | P1 | P2 | P3 | P4 | P5 | Y1 | Y2 | Y3 | Y4 | |
| Normal | 0.95 | 0.08 | 0 | 1 | 0.56 | −0.4655 | 0.4157 | 0.7304 | 0.1443 | F0 |
| Physically damaged | 0.00 | 1.00 | 0 | 0.00 | 0.44 | 0.9582 | −0.0563 | −0.0048 | 0.0175 | F1 |
| Software conflict | 0.12 | 0.89 | 1 | 0.45 | 0.65 | 0.7476 | −0.8137 | 0.3493 | −0.3920 | F2 |
| Network congestion | 0.38 | 0.52 | 0 | 0.61 | 0.70 | −0.1865 | −0.6269 | 0.9131 | 0.4563 | F3 |
| Environmental impact | 0.32 | 0.63 | 0 | 0.35 | 0.89 | −0.6445 | −0.2024 | −0.4057 | −0.8022 | F4 |

The present embodiment combines the passive network information acquisition technology, that is, the data packet marking technology in the wireless sensor network, with the BP neural network technology, to establish a wireless sensor network diagnostic technique. The passive network information acquisition technology adds extra 4-byte data packet payload in the message packet to provide the original information for network diagnostics. Compared with the sink node active inquiry mode, the passive information acquisition method greatly reduces the network communication expenses. Using the adaptive learning rate method in the BP neural network can effectively avoid the problems of the unstable network weight variable due to the large learning rate, and of the too slow learning rate due to the too small learning rate. With this method, the error can be limited to a very small range, thus ensuring the accuracy of failure classification and obtaining a more satisfactory result. The method has broad application prospects in the wireless sensor network application system.

The Third Embodiment

Figure 7:
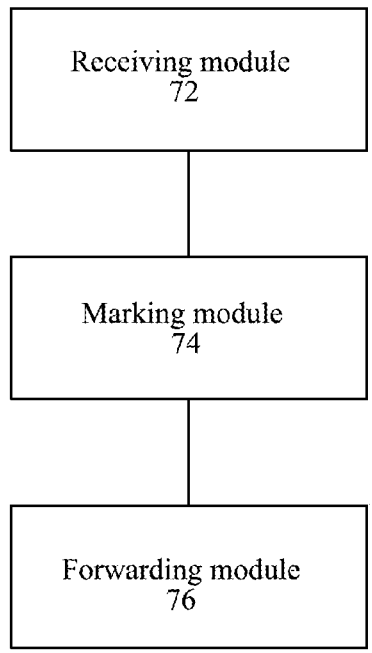
FIG. 7 is a structural diagram of a reporting device for a network state in accordance with a third embodiment of the present document.

The present embodiment provides a reporting device for a network state, and the device can be provided in an intermediate node the above-mentioned embodiment, as shown in FIG. 7, the device comprises the following modules:

the receiving module 72, configured to receive a data packet;

the marking module 74, connected with the receiving module 72, and configured to mark the data packet according to the current network state;

the forwarding module 76, connected with the marking module 74, and configured to forward the marked data packet.

Wherein, the marking module 74 comprises: a judging unit, configured to judge whether the data packet is the first data packet sent by the source node or not according to the source node identity in the data packet; a checking unit, connected with the judging unit, and configured to, when the judging result of the judging unit is YES, check whether the data packet carries the marking information of other nodes or not; a marking unit, connected with the checking unit, and configured to, when the checking result of the checking unit is NO, write the intermediate node identity into a subfield specified by the data packet, and record the source node identity and the data packet sequence number in the local data structure.

Preferably, the marking module 74 further comprises: a link quality detecting unit, configured to detect whether the worst link quality in the data packet is greater than the current link quality in the data packet or not; a link quality marking unit, connected with the link quality detecting unit, and configured to, when the detecting result of the link quality detecting unit is YES, mark the value of the subfield where the worst link quality is located as the current link quality.

The above-mentioned marking module 74 further comprises: a searching unit, configured to, when the judging result of the judging unit is NO, search the local data structure for a data structure entry corresponding to the source node ID; a sequence number judging unit, connected with the searching unit and configured to judge whether the data packet sequence number in the data packet and the data packet sequence number in the data structure entry searched out by the searching unit are continuous or not; a hop number modifying unit, connected with the sequence number judging unit and configured to, when the judging result of the judging unit is YES, update the data packet sequence number in the data structure entry and modify the number of hops in the data packet; a node marking unit, connected with the sequence number judging unit, and configured to, when the judging result of the sequence number judging unit is NO, mark the intermediate node identity in the data packet.

Figure 8:
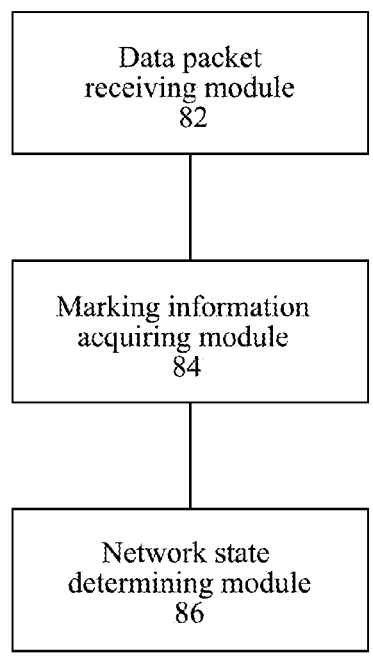
FIG. 8 is a structural diagram of a detecting device for a network state in accordance with the third embodiment of the present document.

The present embodiment provides a detecting device for a network state, wherein, the device may be provided in the sink node of the above-mentioned embodiment, and referring to FIG. 8, the device comprises the following modules:

the data packet receiving module 82, configured to receive a data packet;

the marking information acquiring module 84, connected with the data packet receiving module 82, and configured to parse the data packet to acquire the marking information of the network state;

the network state determining module 86, connected with the marking information acquiring module 84, and configured to determine the network state according to the marking information.

Wherein, the marking information acquiring module 14 comprises: a parsing unit, configured to parse the data packet; a marking information extracting unit, connected with the parsing unit, and configured to extract the marking information parsed out by the parsing unit, wherein the marking information comprises a source node identity, a data packet sequence number, an intermediate node identity, worst link quality, current link quality and the number of hops; individual piece of information has the same meaning as its peer in the above-mentioned embodiment and will not be repeated here.

Preferably, the network state determining module 86 comprises the following units:

the checking unit, configured to check in the local path database whether there is a path entry corresponding to the source node in the data packet or not;

the first state determining unit, connected with the checking unit and configured to, when the checking result of the checking unit is YES, determine the network state as a state that the topology information of the source node is not established;

the database modifying unit, connected with the first state determining unit and configured to, when the first state determining unit determines the network state as a state that the topology information of the source node is not established, add a source node entry into the local path database, wherein the source node entry comprises: the intermediate node identity, the number of hops, the data packet sequence number and the worst link quality;

the second state determining unit, connected with the checking unit and configured to, when the checking result of the checking unit is NO, generate a network state preliminary report according to the marking information and update the source node entry according to the marking information; and make a statistic for the network state preliminary reports within a specified period, and determine the network state according to the statistic result.

Wherein, the second state determining unit comprises: A comparing sub-unit, configured to make a comparison to judge whether the sequence number in the data packet and the sequence number corresponding to the source node in the local path database are continuous or not; an error report generating sub-unit, connected with the comparing sub-unit and configured to, when the comparing result of the comparing sub-unit is discontinuity, generate an error report of packet loss; a transmission success report generating sub-unit, connected with the comparing sub-unit and configured to, when the comparing result of the comparing sub-unit is continuity, generate a transmission success report; a routing switch report generating sub-unit, connected with the checking unit and configured to judge whether the data packet is routing switched or not according to the source node entry, and if yes, generate a routing switch report; a link quality report generating sub-unit, connected with the checking unit and configured to generate the worst link quality report of the source node according to the source node entry.

The second state determining unit comprises: a network information determining sub-unit, configured to determine the network information according to the statistic result, wherein the network information comprises at least one of the following: a packet transmission success rate, a packet loss rate of the source node, with or without routing switch, the worst link quality corresponding to the source node, and the worst link quality similarity between the source node and the adjacent nodes; a network state determining sub-unit, configured to use the BP neural network to determine the network state according to the network information determined by the network information determining sub-unit, wherein, the network state is divided into the following categories: normal, physically damaged, software conflict, network congestion and environmental impact.

Figure 9:
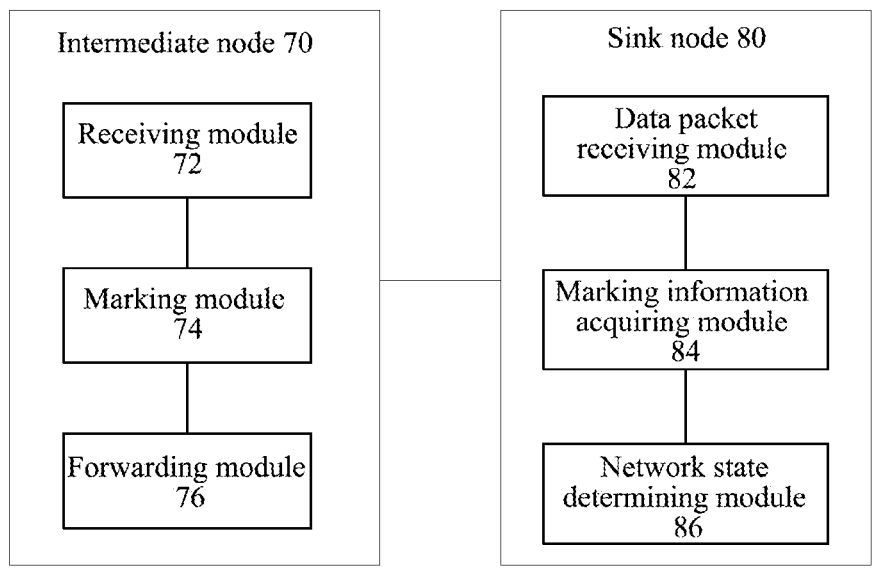
FIG. 9 is a structural diagram of a detecting system for a network state in accordance with the third embodiment of the present document.

The present embodiment also provides a detecting system for a network state, and referring to FIG. 9, the system comprises: the intermediate node 70 and the sink node 80, and the intermediate node 70 and the sink node 80 are connected together, wherein, the intermediate node 70 comprises the above-mentioned reporting device for a network state, and the sink node 80 comprises the above-mentioned detecting device for a network state.

The device and system provided in the present embodiment can also be used in the wireless sensor network.

The intermediate node in this embodiment marks the received data packet, in turn, the sink node is enabled to judge the current network state according to the marking information, this mode of directly marking the data packet does not need the sink node to initiate an inquiry, while the sink node directly uses the marking information in the data packet to learn the network state, which reduces the message signaling in the network state detecting process and solves the problem of relatively heavy network burden due to the mode of actively inquiry to determine the network state, thus prolonging the life of each node and optimizing the system performance.

From the above description, it can be seen that the above-mentioned embodiment uses the data packet marking technology combined with the BP neural network technology, by marking the network state information in the data packet, the network communication expenses are greatly reduced. The BP neural network protects the accuracy of failure classification and has a relatively satisfactory outcome, thus further optimizing the system performance Obviously, the person skilled in the art should understand that each module or each step in the present document can be realized with general-purpose computing device, they can be concentrated in a single computing device or distributed on a network composed of a plurality of computing devices, optionally, they may be implemented with executable program codes in the computing device, so that they can be stored in the storage device and executed by the computing device, and, in some cases, an execution order of the steps may be different from the execution order shown or described here, alternatively, they may be made into individual integrated circuit modules respectively, or a plurality of modules or steps among them may be made into a single integrated circuit module. Thus, the present document is not limited to any specific combination of hardware and software.

The above description is only preferred embodiments of the present document and is not intended to limit the present document, and for those skilled in the art, the present document may have various changes and variations. Without departing from the spirit and principles of the present document, any modification, equivalent replacement, improvement, and so on, should be included within the protection scope of the present document.

What is claimed is:

1. A reporting method for a network state, comprising:
an intermediate node receiving a data packet;
said intermediate node marking said data packet according to a current network state;
said intermediate node forwarding the marked data packet;
wherein, said data packet carries a source node identity and a data packet sequence number;
said intermediate node marking said data packet according to the current network state comprises:
said intermediate node judging whether said data packet is a first data packet sent by said source node or not according to said source node identity, if yes, checking whether said data packet carries identity information of other nodes or not;
if it is checked out that said data packet does not carry identity information of other nodes, said intermediate node writing an intermediate node identity into a specified subfield in said data packet, and recording said source node identity and said data packet sequence number in a local data structure.

2. The method of claim 1, wherein, said data packet further carries worst link quality and current link quality;
before said intermediate node judges whether said data packet is the first data packet sent by said source node or not according to said source node identity, said method further comprises:
after said intermediate node receives said data packet, said intermediate node updating said current link quality in said data packet according to link quality of the intermediate node itself, and checking whether said worst link quality in said data packet is greater than the updated current link quality or not; if yes, said intermediate node marking a value of a subfield where said worst link quality is located as the updated current link quality.

3. The method of claim 2, wherein, said data packet carries a number of hops passed by said data packet during transmission;
said intermediate node marking said data packet according to a current network state comprises:
when said intermediate node checks out that said data packet is not the first packet sent by said source node, said intermediate node searching said local data structure for a data structure entry corresponding to said source node identity;
said intermediate node judging whether a data packet sequence number in said data packet and a data packet sequence number in said data structure entry are continuous or not, if yes, updating said data packet sequence number in said data packet structure entry, and modifying the number of hops in said data packet; otherwise, marking said intermediate node identity in said data packet.

4. The method of claim 1, wherein, said data packet carries a number of hops passed by said data packet during transmission;
said intermediate node marking said data packet according to a current network state comprises:
when said intermediate node checks out that said data packet is not the first packet sent by said source node, said intermediate node searching said local data structure for a data structure entry corresponding to said source node identity;
said intermediate node judging whether a data packet sequence number in said data packet and a data packet sequence number in said data structure entry are continuous or not, if yes, updating said data packet sequence number in said data packet structure entry, and modifying the number of hops in said data packet; otherwise, marking said intermediate node identity in said data packet.

5. A detecting method for a network state, comprising:
a sink node receiving a data packet;
said sink node parsing said data packet to obtain marking information of the network state;
said sink node determining said network state according to said marking information;
wherein, said marking information comprises a source node identity, a data packet sequence number, an intermediate node identity, worst link quality, current link quality and a number of hops;
said sink node determining said network state according to the marking information comprises:
said sink node checking in a local path database whether there is a path entry corresponding to said source node or not;
if not, said sink node determining said network state as a state that topology information of said source node is not established, and adding a source node entry into said local path database, wherein said source node entry comprises: the intermediate node identity, the number of hops, the data packet sequence number and the worst link quality;
if yes, said sink node generating a network state preliminary report according to said marking information, and updating said source node entry according to said marking information;
said sink node making a statistic for said network state preliminary reports within a specified period, and determining said network state according to a statistic result.

6. The method of claim 5, wherein, said sink node generating said network state preliminary report according to said marking information comprises:
said sink node making a comparison to judge whether a sequence number in said data packet and a sequence number corresponding to said source node in said local path database are continuous or not, if not, generating an error report of packet loss, if yes, generating a transmission success report;
said sink node determining whether said data packet is routing switched or not according to said source node entry, if yes, generating a routing switch report;
said sink node generating a worst link quality report of said source node according to said source node entry.

7. The method of claim 6, wherein, said sink node determining said network state according to said statistic result comprises:
said sink node determining network information according to said statistic result, wherein, said network information comprises at least one of the following: a data packet transmission success rate, a data packet loss rate of said source node, with or without routing switch, and a parameter of worst link quality corresponding to said source node, as well as a worst link quality similarity between said source node and an adjacent node;
said sink node, according to said network information, using a back-propagation (BP) neural network to determine said network state, wherein, said network state is divided into following categories: normal, physically damaged, software conflict, network congestion and environmental impact.

8. The method of claim 7, wherein, a process of determining said back-propagation neural network comprises: said sink node setting the back-propagation (BP) neural network of a hidden layer, and setting an activation function corresponding to said hidden layer, as well as setting an output layer function;
said sink node inputting received training samples into said back-propagation neural network, and setting E, a square sum of errors between a BP neural network output and an expected output:

$$E = \frac{1}{2}\sum_{k=1}^{l}\left\{d_k - f\left[\sum_{j=0}^{m}w_{jk}f\left(\sum_{i=0}^{n}v_{ij}x_i\right)\right]\right\}^2$$

Wherein, l represents that there are totally l nodes at the output of said back-propagation neural network, $d_k$ is an expected output vector, f is an activation function of the hidden layer, m represents a number of nodes in the hidden layer, n indicates a number of nodes in an input layer, $w_{jk}$ represents a weight between the $j^{th}$ node in the hidden layer and the $k^{th}$ node in the output layer, $v_{ij}$ is a weight between the $i^{th}$ node in the input layer and the $j^{th}$ node in the hidden layer, and $x_i$ represents an input value of the $i^{th}$ node in an input vector of the input layer;
said sink node narrowing E down to a preset target range by adjusting $w_{jk}$ and $v_{ij}$; wherein, $$\Delta w_{jk} = \eta(d_k - o_k)o_k(1 - o_k)y_j;$$

$$\Delta v_{ij} = \eta\left(\sum_{k=1}^{l}\delta_k^o w_{jk}\right)y_j(1 - y_i)x_i;$$

wherein, $\eta$ is a gradient descent constant, indicating a scale factor, and $\eta\epsilon(0,1)$; $y_j$ is an output value of the $j^{th}$ node in an output vector of the output layer, $o_k$ is the output vector of the output layer, $d_k$ is the expected output vector, and $\delta_k^o$ is a back-propagation error of an output node k.

9. A reporting device for a network state, comprising:
one or more processors;
a receiving module, implemented by the one or more processors and configured to receive a data packet;
a marking module, implemented by the one or more processors and configured to mark said data packet according to a current network state;
a forwarding module, implemented by the one or more processors and configured to forward the marked data packet;
wherein, said marking module comprises:
a judging unit, implemented by the one or more processors and configured to judge whether said data packet is a first data packet sent by a source node or not according to a source node identity in said data packet;
a checking unit, implemented by the one or more processors and configured to, when a judging result of said judging unit is YES, check whether said data packet carries marking information of other nodes or not;
a marking unit, implemented by the one or more processors and configured to, when a checking result of said checking unit is NO, write an intermediate node identity into a specified subfield of said data packet, and record said source node identity and a data packet sequence number of said data packet in a local data structure.

10. The device of claim 9, wherein, said marking module further comprises:
- a link quality detecting unit, implemented by the one or more processors and configured to, after receiving said data packet, update current link quality in said data packet according to link quality in the link quality detecting unit itself, and detect whether worst link quality in said data packet is greater than the updated current link quality or not;
- a link quality marking unit, implemented by the one or more processors and configured to, when a detecting result of said link quality detecting unit is YES, mark a value of a subfield where said worst link quality is located as the updated current link quality.

11. The device of claim 9, wherein, said marking module further comprises:
- a searching unit, implemented by the one or more processors and configured to, when the judging result of said judging unit is NO, search said local data structure for a data structure entry corresponding to said source node identity;
- a sequence number judging unit, implemented by the one or more processors and configured to judge whether the data packet sequence number in said data packet and a data packet sequence number in said data structure entry searched out by said searching unit are continuous or not;
- a hop number modifying unit, implemented by the one or more processors and configured to, when the judging result of said sequence number judging unit is YES, update said data packet sequence number in said data structure entry, and modify a number of hops in said data packet;
- a node marking unit, implemented by the one or more processors and configured to, when the judging result of said sequence number judging unit is NO, mark said intermediate node identity in said data packet.

12. A detecting device for a network state, comprising:
one or more processors;
a data packet receiving module, implemented by the one or more processors and configured to receive a data packet;
a marking information acquiring module, implemented by the one or more processors and configured to parse said data packet to obtain marking information of a network state;
a network state determining module, implemented by the one or more processors and configured to determine said network state according to said marking information; wherein,
said marking information acquisition module comprises: a parsing unit, implemented by the one or more processors and configured to parse said data packet; a marking information acquiring unit, implemented by the one or more processors and configured to acquire mark information parsed out by said parsing unit, wherein said marking information comprises a source node identity, a data packet sequence number, an intermediate node identity, worst link quality, current link quality and a number of hops;
said network state determining module comprises:
a checking unit, implemented by the one or more processors and configured to check whether there is a path entry corresponding to the source node in said data packet in a local path database or not;
a first state determining unit, implemented by the one or more processors and configured to, when a checking result of said checking unit is YES, determine the network state as a state that topology information of said source node is not established;
a database modifying unit, implemented by the one or more processors and configured to, when said first state determining unit determines the network state as a state that said topology information of said source node is not established, add a source node entry into said local path database, wherein said source node entry comprises: the intermediate node identity, the number of hops, the data packet sequence number and the worst link quality;
a second state determininq unit, implemented by the one or more processors and configured to, when the checking result of said check unit is NO, generate a network state preliminary report according to said marking information, and update said source node entry according to said marking information; and make a statistic for network state preliminary reports within a specified period, and determine the network state according to a statistic result.

13. The device of claim 12, wherein, said second state determining unit comprises:
- a comparing sub-unit, implemented by the one or more processors and configured to make a comparison to judge whether said sequence number in said data packet and a sequence number corresponding to said source node in said local path database are continuous or not;
- an error report generating sub-unit, implemented by the one or more processors and configured to, when a comparing result of said comparing sub-unit is discontinuity, generate an error report of packet loss;
- a transmission success report generating sub-unit, implemented by the one or more processors and configured to, when the comparing result of said comparing sub-unit is continuity, generate a transmission success report;
- a routing switch report generating sub-unit, implemented by the one or more processors and configured to judge whether said data packet is routing switched or not according to said source node entry, and if yes, generate a routing switch report;
- a link quality report generating sub-unit, implemented by the one or more processors and configured to generate a worst link quality report of said source node according to said source node entry.

14. The device of claim 13, wherein, said second state determining unit comprises:
- a network information determining sub-unit, implemented by the one or more processors and configured to determine said network information according to said statistic result, wherein, said network information comprises at least one of the following: a data packet transmission success rate, a packet loss rate of said source node, with or without routing switch, a parameter of worst link quality corresponding to said source node, and a worst link quality similarity between said source node and an adjacent node;
- a network state determining sub-unit, implemented by the one or more processors and configured to, according to said network information determined by said network information judging sub-unit, use a back-propagation neural network to determine said network state, wherein, said network state is divided into the following categories: normal, physically damaged, software conflict, network congestion and environmental impact.

15. A detecting system for a network state, comprising: an intermediate node and a sink node, wherein, said intermediate node comprises:
one or more first processors;
a receiving module, implemented by the one or more first processors and configured to receive a data packet;
a marking module, implemented by the one or more first processors and configured to mark said data packet according to a current network state;
a forwarding module, implemented by the one or more first processors and configured to forward the marked data packet;
said sink node comprises:
one or more second processors;
a data packet receiving module, implemented by the one or more second processors and configured to receive a data packet;
a marking information acquiring module, implemented by the one or more second processors and configured to parse said data packet to obtain marking information of a network state;
a network state determininq module, implemented by the one or more second processors and configured to determine said network state according to said marking information;
wherein, said marking module comprises:
a judging unit, implemented by the one or more first processors and configured to judge whether said data packet is a first data packet sent by a source node or not according to a source node identity in said data packet;
a checking unit, implemented by the one or more first processors and configured to, when a judging result of said judging unit is YES, check whether said data packet carries marking information of other nodes or not;
a marking unit, implemented by the one or more first processors and configured to, when a checking result of said checking unit is NO, write an intermediate node identity into a specified subfield of said data packet, and record said source node identity and a data packet sequence number of said data packet in a local data structure.

* * * * *